June 20, 1967
W. C. RUDD
3,327,088
METHOD AND APPARATUS FOR WELDING SPACED LUGS
AND THE LIKE TO AN ELONGATED MEMBER
Filed May 7, 1964
2 Sheets-Sheet 1
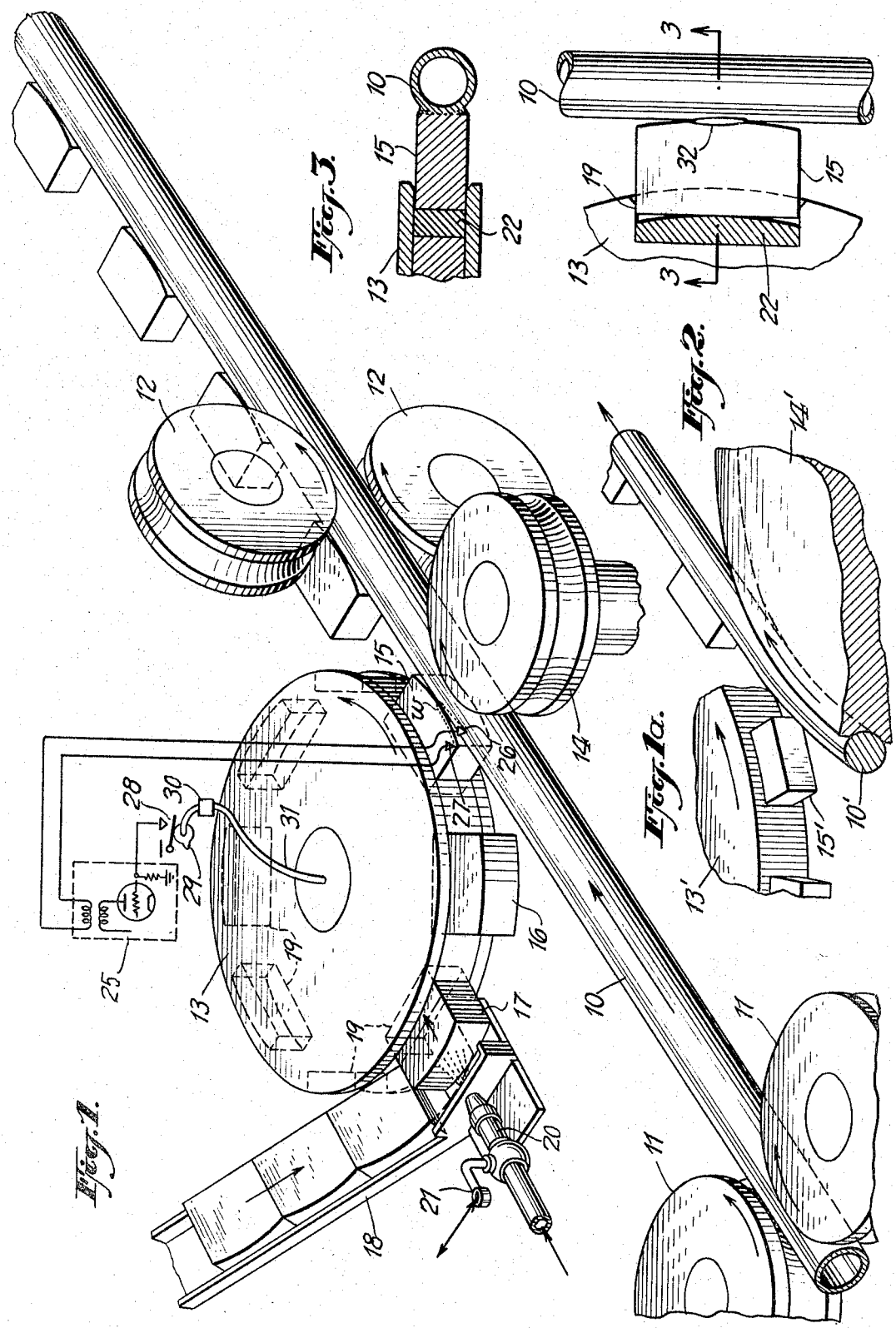

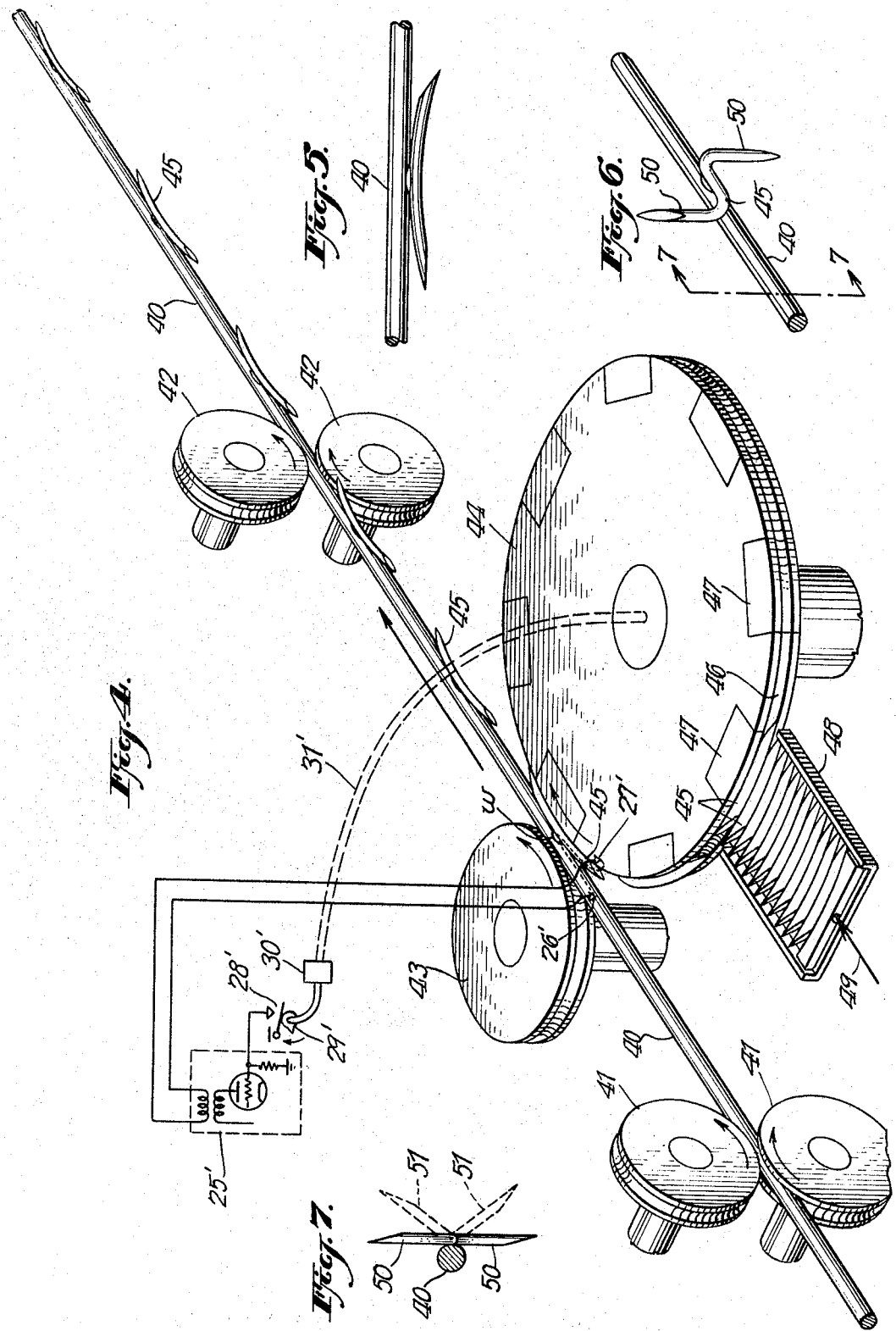

United States Patent Office 3,327,088
Patented June 20, 1967

3,327,088
METHOD AND APPARATUS FOR WELDING SPACED LUGS AND THE LIKE TO AN ELONGATED MEMBER
Wallace C. Rudd, Larchmont, N.Y., assignor to American Machine & Foundry Company, New York, N.Y., a corporation of New Jersey
Filed May 7, 1964, Ser. No. 365,835
17 Claims. (Cl. 219—79)

This invention relates to methods and apparatus for welding a series of small parts, such as lugs, barbs, short strips or the like, in spaced-apart relation on an elongated member, and more particularly by the use of high frequency heating current to accomplish the welding.

The invention is adapted for producing products in the form of an elongated metal tube, rod, strip or the like, onto which a succession of spaced-apart elements of metal are permanently secured by being welded in position. Such products may, for example, be adapted for use in heat exchangers or boilers where lugs of steel may be welded to the steel boiler tubes along a side thereof in spaced relation to each other. The products of the invention in some forms may also be adapted for use to provide constructions in the nature of sprocket chains, racks or ratchets. A further example constitutes a form of barbed wire comprised for example of a single wire strand on which spaced-apart barbs are securely welded.

A well known welding method now in use involves rapidly advancing longitudinally a pair of metal portions past a well point where the portions are brought together under pressure to form a forged weld, there being applied to the metal portions respectively, prior to the weld point, contacts connected to the terminals of a source of high frequency current, whereby current flows from such contacts along the surfaces of the metal portions to and from the weld point as such surfaces approach each other with a V-shaped gap therebetween, the apex of the gap being at the weld point and substantially at the point where the surfaces of the approaching metal portions have become heated up to welding temperature by reason of the high frequency current being closely concentrated on the very surfaces of the approaching members, and whereby a dependable uniform forged weld is secured at the weld point, without heating the metal to welding temperature or appreciably softening same, except on the very surfaces which come into welded engagement. This method has proven to be a highly satisfactory way of uniformly and effectively forming a continuous forged weld between the rapidly advancing metal portions.

In accordance with the invention disclosed in my co-pending application Ser. No. 358,447, filed Apr. 9, 1964, entitled, "High Frequency Welding and Shaping of Metal Parts," certain of the principles of the above-described known welding method are utilized for welding together the longitudinally-advancing pair of metal portions at predetermined spaced intervals only. The present invention concerns an alternative for the invention of said co-pending application and wherein, instead of welding together a pair of advancing metal portions, in some respects similar principles are used to weld to one elongated metal portion, a succession of the above-mentioned spaced-apart lugs, barbs or other small items.

In accordance with the invention, an elongated member, such as a tube, rod, wire, strip or the like, as above mentioned, is rapidly advancing longitudinally past a weld point, where suitable mechanism is located for automatically feeding the small items in succession up to the weld point as the elongated member passes, the latter member and the small items being forced together under pressure while passing the weld point. The small items are arranged to approach the weld point in a manner whereby they will form with the elongated member, a V-shaped gap, to the sides of which high frequency current is applied at the proper moment in the manner above described, for heating the gap edges to welding temperature at the weld point, the current being discontinued upon completion of a weld of the desired length, and until the next small item is brought up to position to be welded.

The automatic means for feeding the small elements up to welding position may take the form of a rotatable magazine-like arrangement, onto which such elements may be suitably automatically fed into spaced-apart positions around the periphery of the magazine and there held as by the use of magnets, clamps or other means, until same become welded to the elongated member and are thereafter carried along by the latter. The source of high frequency power may be controlled in any suitable manner so as to provide pulses of the high frequency current which persist only for the duration of the intervals of necessary preheating and welding of each element. Thus no arcing need occur, because the current need not be applied while the contacts are coming into engagement with or leaving contact with each of the small elements.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of one embodiment of the invention in a form adapted to weld a succession of spaced lugs to an elongated member in the form of an advancing rod or tube;

FIG. 1a is a perspective view, with parts broken away, showing portions of a somewhat modified arrangement;

FIG. 2 is a detail plan view of the area where the lugs are being welded to the elongated member;

FIG. 3 is a sectional view taken substantially along line 3—3 of FIG. 2;

FIG. 4 is a somewhat schematic perspective view of an alternative form of the invention, particularly adapted for the welding of a succession of barbs to a wire to form barbed wire or the like;

FIG. 5 is an enlarged view showing one of the barbs as welded to the wire, but before the barb ends have been deflected to protruding positions;

FIG. 6 is a perspective view showing one of the barbs as welded in place, and after its points have been deflected transversely of the wire; and FIG. 7 is a sectional view taken along line 7—7 of FIG. 6 and showing alternative positions to which the barb ends may be deflected.

Referring now to FIG. 1 in further detail, an elongated member, as at 10, in the form of a rod, tube or the like, is shown as being rapidly advanced in the direction of the arrow, past a weld point w, by use of suitable means such as pairs of driven rollers 11 and 12. Rollers as at 13, 14 are provided at opposite sides of the weld point for forcing the member 10 into firm engagement with each of a succession of lugs, such as indicated at 15, during the short interval while the lug is being welded to the member 10. The roller 13 may take the form of a rotatable carrier or magazine, driven by any suitable means (not shown) for carrying a succession of the lugs 15, 16, 17 etc., at spaced positions around its periphery. The lugs may be fed by any suitable means onto the carrier 13. For example, as shown, a succession of the lugs may slide down a guide trough 18, each into a position such as to enter one of a series of receiving slots, as at 19 on the member 13. Any suitable means, such as jets of air from a nozzle 20, may be used to urge each lug at the proper time into one of the receiving slots 19, the air jet being controlled intermittently, if desired, by any suitable means (not shown) which will actuate a valve 21 and, at the proper moment, move one of the lugs from the base of the trough 18, into one of the receiving slots 19. Each of the slots 19 may contain in the base thereof, suitable means for holding a lug therein in place until the lug is discharged after being welded to the member 10. In the form here shown (see FIGS. 2 and 3) a strong permanent magnet, such as indicated at 22, may be secured in the base of each slot 19.

A source of high frequency current may be provided in the form of an oscillator, as schematically indicated at 25, the terminals of which are connected to contacts 26 and 27, which engage respectively the metal on opposite sides of the V-shaped gap which occurs between each of the lugs and the member 10, just in advance of the weld point w, whereby the current from these contacts will flow along the sides of such V-shaped gap to and from the weld point, as indicated by the dotted lines, thereby to heat the opposed surfaces of the gap up to welding temperature upon reaching the weld point. The current used may be of a frequency of about 50,000 cycles per second, or preferably much higher, such as in the range of 300,000 to 450,000 cycles, and with such frequency, the current on the opposed surfaces of the V-shaped gap above mentioned, will be strongly concentrated on the very surfaces, so that, upon their reaching welding temperature, the metal in depth will still remain firm, and thus the lugs may be secured to the member 10 by a good forged type of weld.

As above indicated, normally the current from the oscillator will be shut off. In the particular form of arrangement shown, as in the case of the above-mentioned co-pending application, this may be accomplished by applying a negative blocking potential to the grid of the oscillator 25, through the medium of a contact switch 28, which in turn may be operated at suitable intervals as by a rotating cam 29. This cam, in turn, may be connected through suitable gearing at 30, to be driven at an appropriate or adjustable speed, as by a suitable drive connection 31, connected to the shaft of the rotatable magazine 13. In this way and through the use of appropriate gearing at 30, the oscillator may normally be "blocked" from the time of completion of welding of one small element in place, until it is desired to apply the current for welding the next element. It will be understood that the gearing at 30 is to be designed so as to cause rotation of the cam 29 and operation of the switch 28 at proper times correlated with the positioning of the elements 15 in the magazine 30, so that the heating current will preferably be applied and discontinued at the proper moments for welding each of the elements.

As explained in the above-mentioned co-pending application, the current should preferably be applied not only for the short interval during which the small region to be welded is passing the weld point w, but, in order to heat the approaching V-gap edges up to welding temperature to start the weld, the current will be turned on for a short interval prior to actual commencement of the welding; and to avoid arcing, the current may be cut off by blocking action of the oscillator just before the contact 27 is passed by the trailing edge of each element.

As shown in the various figures, the surfaces of the small elements 15, which are to face the member 10, may be curved slightly to afford clearance, permitting such surface to come into proper engagement for forming a weld, for example, extending along the mid-portion of the element, as best indicated at 32 in FIG. 2.

In the somewhat modified arrangement of FIG. 1a, a rod or other elongated member 10' is guided onto squeeze roller 14' in a somewhat curved position, thereby facilitating any clearance problems in bringing the elements 15' into position for welding. Also, if desired, the sockets containing these elements, or the magnets therein, may be constructed and arranged somewhat resiliently to press the elements into welding position, while avoiding jamming when coming into place against the elongated member 10'.

With the form of the invention shown in FIG. 4, a continuing length of wire 40 is being advanced as by pairs of rollers 41, 42 (some or all of which may be driven) so that the wire will pass the weld point w where squeeze roller means 43 and 44 serve to bring succesive barb members, as at 45, into welding engagement with the wire 40. Here the roller 44 takes the form of a carrier or magazine, which is rotated in any suitable manner (not shown) for feeding a succession of the barbs into place. Thus the magazine 44 may be provided around its periphery with a channel or groove 46, which, at spaced-apart areas, may be constituted of permanent magnets as at 47, each of which will serve temporarily to hold one of the barbs in place, and carry same from a feeding trough 48 around to the weld point. The barbs may be fed by suitable means in the direction indicated by the arrow 49 under pressure against the magnets, so that each magnet will carry one of the barbs along to welding position, and after the barb becomes welded to the wire, it will be pulled along with the wire and advanced to a later point where the barbs, if desired, may have their points deflected, as shown at 50 in FIG. 6. As shown in FIG. 7, alternate barbs may desirably have their points deflected at different desired angles, as indicated at 51.

Similarly, in FIG. 4, as in the embodiment of FIG. 1, the high frequency current may be supplied by an oscillator 25', the terminals of which are connected to contacts 26' and 27', the pulsing circuit being controlled so as to apply the welding current only during the necessary periods for forming each of the succession of welds, and in accord with the timing of the rotation of the magazine 44, connected through drive means 31', gear means 30', to cam 29' for operating a switch 28'. While, as in the case of FIG. 1, one of the contacts may be applied to the elongated member and the other to one of the small elements to be welded thereto, it may be found preferable (as shown in FIG. 4) to apply the contact 27' to the rotating magazine 44. In that event, the high frequency current will flow from contact 26' along one side of the V-gap to the weld point, thence along the opposed side of the V-gap on one of the elements 45 and (as indicated by the dotted line) from there over to the metal rim of element 44, to the contact 27'. In this way, contact 27' can constantly engage the member 24 without disturbing the position of the contact, as would be the case if it were to engage successively each of the elements 45.

Suitable automatic methods and apparatus for bending the barbs into protruding positions are disclosed in my co-pending application Ser. No. 365,836, filed concurrently herewith, entitled "Method and Apparatus for Welding Barbs to Wire and the Like."

The above-described method and apparatus for forming the barbed wire and the like has a number of important advantages as compared with the conventional method of using a twisted pair of wires with barbs twisted about said pair at spaced positions. That is, with the present invention, only one wire is required as the carrier for the barbs, and yet the barbs being welded in position, cannot become displaced longitudinally. Also the present method makes possible a considerable saving of metal, not only because only a single carrier wire is necessary, but also because it is unnecessary to twist each barb around the wire. With the present invention it is quite practical to utilize galvanized wire and to make the welds at the desired locations, despite the galvanizing, and the areas of welding are protected electrolytically by the adjacent zinc.

With reference to FIG. 1a, in the light of the above descriptions, according to another aspect or variation of the invention, the member 10' may be considered, for example, as a metal portion comprising a part of the surface of a cylindrical or other workpiece onto which the spaced-apart elements 15' are to be welded.

Although certain particular embodiments of the invention are herein disclosed for purposes of explanation, further modifications thereof, after study of this specification, will be apparent to those skilled in the art to which the invention pertains. For example, with some embodiments of the invention, the high frequency heating current may be applied in other ways known in the high frequency welding art. Reference should accordingly be had to the appended claims in determining the scope of the invention.

What is claimed and desired to be secured by Letters Patent is:

1. Method for welding a succession of metal elements to an elongated metal member at spaced predetermined positions on the later, the welding of said elements being effected along a path extending longitudinally along on said member, which method comprises: rapidly advancing longitudinally said elongated member past a weld point; advancing said elements into contact with said elongated member at said predetermined positions on said member, the elements being thus advanced along a path whereby they form a V-shaped gap with said member with the vertex of the gap at the weld point; causing pulses of current of a frequency of 50,000 cycles per second or higher to flow along on the opposed surfaces of said gap to and from the weld point; timing said pulses to occur as each element is passing the weld point, thereby heating the approaching and contacting surfaces of said member and of each of said elements to welding temperature; and forcing said member and each of said elements together under pressure at the region of the weld point, whereby each element becomes welded to the member and is advanced along from the weld point with the member.

2. Method for welding a succession of metal elements to an elongated metal member at spaced predetermined positions on the latter, the welding of said elements being effected along a path extending longitudinally along on said member, which method comprises: rapidly advancing longitudinally said elongated member past a weld point; advancing said elements into contact with said elongated member at said predetermined positions on said member; causing pulses of high frequency current to flow along on the opposed surfaces of said member and each of said elements; timing said pulses to occur as each element is passing the weld point, thereby heating the contacting surfaces of said member and of each of said elements to welding temperature; and forcing said member and each of said elements together under pressure at the region of the weld point, whereby each element becomes welded to the member and is advanced along from the weld point with the member.

3. Method for welding a succession of metal elements to an elongated metal member at spaced predetermined positions on the latter, the welding of said elements being effected along a path extending longitudinally along on said member, which method comprises: rapidly advancing longitudinally said elongated member past a weld point; advancing said elements into contact with said elongated member at said predetermined positions on said member, the elements being thus advanced along a path whereby they form a V-shaped gap with said member with the vertex of the gap at the weld point; causing pulses of high frequency current to flow along on the opposed surfaces of said gap to and from the weld point from contacts located in advance of the weld point; timing each of said pulses to start after one of the elements comes into contact with said member and to stop before the element passes beyond said contacts, thereby heating the approaching and contacting surfaces of said member and of each of said elements to welding temperature; and forcing said member and each of said elements together under pressure at the region of the weld point, whereby each element becomes welded to the member and is advanced along from the weld point with the member.

4. Method for welding a succession of metal elements to an elongated metal member at spaced predetermined positions on the latter, the welding of said elements being effected along a path extending longitudinally along on said member, which method comprises: rapidly advancing longitudinally said elongated member past a weld point; advancing said elements, while controlled in position magnetically, into contact with said elongated member at said predetermined positions on said member; causing pulses of high frequency current to flow along on the opposed surfaces of said member and each of said elements; timing said pulses to occur as each element is passing the weld point, thereby heating the contacting surfaces of said member and of each of said elements to welding temperature; and forcing said member and each of said elements together under pressure at the region of the weld point, whereby each element becomes welded to the member and is advanced along from the weld point with the member.

5. Method for welding a succession of metal elements to an elongated metal member at spaced predetermined positions on the latter, the welding of said elements being effected along a path extending longitudinally along on said member, which method comprises: rapidly advancing longitudinally said elongated member past a weld point; advancing said elements successively while carried on an arcuately-extending carrier portion into contact with said elongated member at said predetermined positions on said member; causing pulses of high frequency current to flow along on the opposed surfaces of said member and each of said elements; timing said pulses to occur as each element is passing the weld point, thereby heating the approaching and contacting surfaces of said member and of each of said elements to welding temperature; and forcing said member and each of said elements together under pressure at the region of the weld point, whereby each element becomes welded to the member and is advanced from the carrier beyond the weld point and along with said member.

6. Method in accordance with the foregoing claim 5 and in which said member is advanced along a curved path past the weld point.

7. Method for welding a succession of metal elements to another metal portion at spaced predetermined positions on the latter, the welding of said elements being effected along a path extending longitudinally along on said member, which method comprises: rapidly advancing said metal portion past a weld point; advancing said elements successively while carried on an arcuately-extending carrier portion into contact with said metal portion at said predetermined positions thereon; causing pulses of high frequency current to flow along on the opposed surfaces of said metal portion and each of said elements; timing said pulses to occur as each element is passing the weld point, thereby heating the approaching and contacting surfaces of said metal portion and of each of said elements to welding temperature; and forcing each of said elements and said metal portion together under pressure at the region of the weld point, whereby each element becomes welded to the metal portion and is advanced from the carrier beyond the weld point and along with said metal portion.

8. Method in accordance with the foregoing claim 7 and in which said metal portion is advanced along a curved path past the weld point.

9. Method for welding a succession of metal elements to another metal member at spaced predetermined positions on the latter, the welding of said elements being effected along a path extending longitudinally along on said member, which method comprises: rapidly advancing said member past a weld point; advancing said elements into contact with said member at said predetermined positions on said member, the elements being thus advanced along a path whereby each forms a V-shaped gap with said member with the vertex of the gap at the weld point; causing pulses of current of a frequency of 50,000 cycles per second or higher to flow along on the opposed surfaces of said gap to and from the weld point; timing said pulses to occur as each element is passing the weld point, thereby heating the approaching and contacting surfaces of said member and of each of said elements to welding temperature; and forcing said member and each of said elements together under pressure at the region of the weld point, whereby each element becomes welded to the member and is advanced along from the weld point with the member.

10. Method for providing a succession of metal barbs on a wire or the like at spaced predetermined positions on the latter, which method comprises: rapidly advancing longitudinally said wire past a weld point; advancing said barbs into contact with said wire at said predetermined positions thereon; the barbs being thus advanced along a path whereby they form a V-shaped gap with said wire with the vertex of the gap at the weld point; causing pulses of current of a frequency of 50,000 cycles per second or higher to flow along on the opposed surfaces of said gap to and from the weld point; timing said pulses to occur as each barb is passing the weld point, thereby heating the approaching and contacting surfaces of said wire and of each of said barbs to welding temperature; and forcing said wire and each of said barbs together under pressure at the region of the weld point, whereby each barb becomes welded to the wire and is advanced along from the weld point with the wire.

11. Method in accordance with the foregoing claim 10 and in which the barbs initially comprise elements extending longitudinally of the wire and are welded at their midportions to the wire, the ends of such elements being thereafter deflected into positions protruding from the wire.

12. Method for welding a succession of barbs or the like to a wire or the like at spaced predetermined positions on the latter, which method comprises: rapidly advancing longitudinally said wire past a weld point; advancing said barbs while controlled in position magnetically into contact with said wire at said predetermined positions on the wire; causing pulses of high frequency current to flow along on the opposed surfaces of said wire and each of said barbs; timing said pulses to occur as each barb is passing the weld point, thereby heating the contacting surfaces of said wire and of each of said barbs to welding temperature; and forcing said wire and each of said barbs together under pressure at the region of the weld point, whereby each barb becomes welded to the wire and is advanced along from the weld point with the wire.

13. Apparatus for welding a succession of metal elements to an elongated metal member at spaced predetermined positions on the latter, the welding of said elements being effected along a path extending longitudinally along on said member, such apparatus comprising in combination: means for rapidly advancing longitudinally said elongated member past a weld point; rotatable means for carrying and advancing said elements into contact with said elongated member at said predetermined positions on said member; means for causing pulses of high frequency current to flow along on the opposed surfaces of said member and each of said elements, including means for timing said pulses to occur as each element is passing the weld point, thereby heating the contacting surfaces of said member and of each of said elements to welding temperature; and means for forcing said member and each of sad elements together under pressure at the region of the weld point, whereby each element becomes welded to the member and is advanced along from the weld point with the member.

14. Apparatus for welding a succession of metal elements to another metal member at spaced predetermined positions on the latter, the welding of said elements being effected along a path extending longitudinally along on said member, such apparatus comprising in combination: means for rapidly advancing said member past a weld point; a rotatable carrier for advancing said elements successively along an arcuately-extending path into contact with said member at said predetermined positions on said member; means for causing pulses of high frequency current to flow along on the opposed surfaces of said member and each of said elements; means for timing said pulses to occur as each element is passing the weld point, thereby heating the approaching and contacting surfaces of said member and of each of said elements to welding temperature; and means for forcing said member and each of said elements together under pressure at the region of the weld point, whereby each element becomes welded to the member and is advanced from the carrier beyond the weld point and along with said member.

15. Apparatus for welding a succession of metal elements to another metal member at spaced predetermined positions on the latter, the welding of said elements being effected along a path extending longitudinally along on said member, such apparatus comprising in combination: means for rapidly advancing said member past a weld point; carrier means for advancing said elements into contact with said member at said predetermined positions thereon, the elements being thus advanced along a path whereby each forms a V-shaped gap with said member with the vertex of the gap at the weld point; means for causing pulses of current of a frequency of 50,000 cycles per second or higher to flow along on the opposed surfaces of said gap to and from the weld point; timing means for said pulses for causing same to occur as each element is passing the weld point, thereby heating the approaching and contacting surfaces of said member and of each of said elements to welding temperature; and means forcing said member and each of said elements together under pressure at the region of the weld point, whereby each element becomes welded to the member and is then advanced therewith.

16. Apparatus in accordance with the foregoing claim 15 and in which said current is applied by contacts located at opposite sides of said gap at points in advance of the weld point, one of said contacts engaging the carrier on which the current is conducted to each of said elements and thence to the weld point and back on the opposite side of the gap to the other contact.

17. Apparatus in accordance with the foregoing claim 16 and in which said carrier means includes a succession of magnets respectively for retaining each of said elements until same become welded to and are carried away on the member.

References Cited
UNITED STATES PATENTS

| | | | |
|---|---|---|---|
| 3,008,496 | 11/1961 | Goddard | 142—112 X |
| 3,047,712 | 7/1962 | Morris | 219—107 |

RICHARD M. WOOD, *Primary Examiner.*

ANTHONY BARTIS, JOSEPH V. TRUHE, *Examiners.*

B. A. STEIN, *Assistant Examiner.*